United States Patent
Cao et al.

(10) Patent No.: US 10,840,486 B2
(45) Date of Patent: Nov. 17, 2020

(54) BATTERY MODULE

(71) Applicant: Contemporary Amperex Technology Co., Limited, Ningde (CN)

(72) Inventors: Gen Cao, Ningde (CN); Jihua Yao, Ningde (CN); Taosheng Zhu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 16/355,637

(22) Filed: Mar. 15, 2019

(65) Prior Publication Data

US 2019/0305272 A1    Oct. 3, 2019

(30) Foreign Application Priority Data

Mar. 29, 2018   (CN) .......................... 2018 1 0268868

(51) Int. Cl.
*H01M 2/10* (2006.01)
*H01M 2/12* (2006.01)
*H01M 10/04* (2006.01)

(52) U.S. Cl.
CPC ....... *H01M 2/1077* (2013.01); *H01M 2/1061* (2013.01); *H01M 2/12* (2013.01); *H01M 10/0481* (2013.01); *H01M 10/0413* (2013.01)

(58) Field of Classification Search
CPC .... H01M 2/1077; H01M 2/1061; H01M 2/12; H01M 10/0481; H01M 10/0413; H01M 2/1241; H01M 2/1016
See application file for complete search history.

(56) References Cited

U.S. PATENT DOCUMENTS

2011/0262799 A1* 10/2011 Kim .................. H01M 10/4207
                                                    429/156
2013/0273404 A1   10/2013 Ochi et al.
(Continued)

FOREIGN PATENT DOCUMENTS

CN         1992385 A      7/2007
CN       101558511 A     10/2009
(Continued)

OTHER PUBLICATIONS

The partial European search report dated Jun. 17, 2019 for European application No. 19164144.8, 14 pages.
(Continued)

*Primary Examiner* — Cynthia K Walls
(74) *Attorney, Agent, or Firm* — Law Offices of Liaoteng Wang

(57) ABSTRACT

The disclosure relates to a battery module. The battery module comprises: a first end plate, a plurality of batteries and a second end plate successively arranged in a direction, wherein the battery comprises a top cover; a connecting component, wherein the first end plate is fixedly connected to the second end plate through the connecting component; and a pulling component comprising a first connecting segment, an intermediate segment and a second connecting segment successively arranged, wherein the first connecting segment is fixedly connected to the first end plate, the intermediate segment is disposed facing the top cover, and the second connecting segment is fixedly connected to the second end plate, and wherein the pulling component can tighten the first end plate and the second end plate in an arrangement direction of the batteries to compress the batteries along with the first end plate and the second end plate.

18 Claims, 4 Drawing Sheets

(56) References Cited

U.S. PATENT DOCUMENTS

| 2015/0135522 | A1* | 5/2015 | Seto | H01M 2/1022 |
| | | | | 29/623.2 |
| 2015/0303509 | A1 | 10/2015 | Tajima | |
| 2016/0141737 | A1* | 5/2016 | Kubota | H01M 10/6555 |
| | | | | 429/120 |

FOREIGN PATENT DOCUMENTS

| CN | 102237501 A | 11/2011 |
| CN | 102110799 B | 2/2015 |
| CN | 105322110 A | 2/2016 |
| CN | 105324866 A | 2/2016 |
| CN | 106711366 A | 5/2017 |
| CN | 206432307 U | 8/2017 |
| CN | 207038572 U | 2/2018 |
| EP | 2141756 A1 | 1/2010 |
| EP | 2874201 A1 | 5/2015 |
| EP | 3026730 A1 | 6/2016 |
| EP | 3079183 A1 | 10/2016 |

OTHER PUBLICATIONS

The Second Official Action and search report dated Sep. 7, 2020 for Chinese application No. 201810268868.8, 14 pages.
The First Official Action and search report dated Jun. 18, 2020 for Chinese application No. 201810268868.8, 14 pages.
The Examination report dated Jun. 30, 2020 for European application No. 19164144.8, 5 pages.

* cited by examiner

BATTERY MODULE

CROSS-REFERENCE TO RELATED APPLICATION

This application is based on and claims priority to Chinese Patent Application No. 201810268868.8 filed on Mar. 29, 2018, which is incorporated herein by reference in its entirety.

FIELD

The present disclosure relates to the technical field of battery, and in particular to a battery module.

BACKGROUND

With continuous developments of sciences and technologies, power batteries are applied to more and more areas involving production and life. In related technology areas, for a battery system, there are battery box, battery module and battery in a high to low sequence of system levels. Domestic and overseas manufacturers of lithium battery usually identify recognize a battery as the smallest unit. First, a battery is manufactured accompanied by a protection device. The batteries are connected and assembled in series or in parallel to form a battery module. With an increasing capacity of battery module, the battery may expand in some cases and thus exert expansion forces on the end plate. This will render the end plate liable to deformation and displacement, which will cause disassembly of the battery module. Therefore, there is a problem of low structural strength in traditional battery modules.

SUMMARY

According to embodiments of the disclosure, there is provided a battery module, which has a high overall structural strength, is unlikely to deform, and keeps stable and reliable in use.

In one aspect, the disclosure provides a battery module comprising: a first end plate, a plurality of batteries and a second end plate successively arranged in a direction, wherein the battery comprises a top cover; a connecting component, wherein the first end plate is fixedly connected to the second end plate through the connecting component; and a pulling component comprising a first connecting segment, an intermediate segment and a second connecting segment successively arranged, wherein the first connecting segment is fixedly connected to the first end plate, the intermediate segment is disposed facing the top cover, and the second connecting segment is fixedly connected to the second end plate, and wherein the pulling component can tighten the first end plate and the second end plate in an arrangement direction of the batteries to compress the batteries along with the first end plate and the second end plate.

According to an aspect of embodiments of the disclosure, the first connecting segment and the second connecting segment are disposed at a same side of the intermediate segment.

According to an aspect of embodiments of the disclosure, the first end plate comprises a first bottom end close to a bottom portion of the battery, and the first connecting segment extends from the intermediate segment toward the first bottom end and is fixedly connected to the first bottom end.

According to an aspect of embodiments of the disclosure, the first connecting segment covers a central region of the first end plate.

According to an aspect of embodiments of the disclosure, the second end plate comprises a second bottom end close to a bottom portion of the battery, and the second connecting segment extends from the intermediate segment toward the second bottom end and is fixedly connected to the second bottom end.

According to an aspect of embodiments of the disclosure, the second connecting segment covers a central region of the second end plate.

According to an aspect of embodiments of the disclosure, the battery comprises a vent disposed at the top cover, and the intermediate segment comprises a clearance hole disposed corresponding to the vent.

According to an aspect of embodiments of the disclosure, the top cover comprises an annular protrusion, wherein the vent is disposed in an inner hole of the protrusion, and the protrusion inserts into the clearance hole to connect with the intermediate segment.

According to an aspect of embodiments of the disclosure, the first end plate comprises a first bottom end close to a bottom portion of the battery, the second end plate comprises a second bottom end close to a bottom portion of the battery, and the connecting component comprises a main body and two free ends disposed at two opposite sides of the main body, wherein one of the free ends is fixedly connected to the first bottom end, and the other free end is fixedly connected to the second bottom end.

According to an aspect of embodiments of the disclosure, there are two connecting components which are spaced apart in a direction perpendicular to the arrangement direction of the batteries to compress the batteries.

According to an aspect of embodiments of the disclosure, the main body comprises a first folded segment and a second folded segment, wherein the first folded segment extends to the bottom portion of the battery to support the battery, and the second folded segment extends toward a top portion of the battery and contacts with a side portion of the battery.

According to an aspect of embodiments of the disclosure, the two free ends are bent to a same side such that the connecting component has a U-shaped structure.

According to embodiments of the disclosure, the battery module comprises a first end plate, a plurality of batteries, a second end plate, a connecting component and a pulling component. The first end plate, the batteries and the second end plate are successively arranged in a direction. The first end plate and the second end plate are fixedly connected through the connecting component and the pulling component to form a fixing frame for fixing the batteries. The first end plate and the second end plate are pulled by the connecting component and the pulling component to tighten the batteries. The structural strength of the battery module is improved. Since the first end plate and the second end plate are restrained by both the connecting component and the pulling component, when the battery expands to exert the expansion force, the first end plate and the second end plate will not move or deform in a direction away from the battery due to the expansion force. The safety and stability of the battery module in use can be effectively ensured.

BRIEF DESCRIPTION OF THE DRAWINGS

Features, advantages, and technical effects of exemplary embodiments of the present disclosure will be described below with reference to accompanying drawings.

Figure 1:
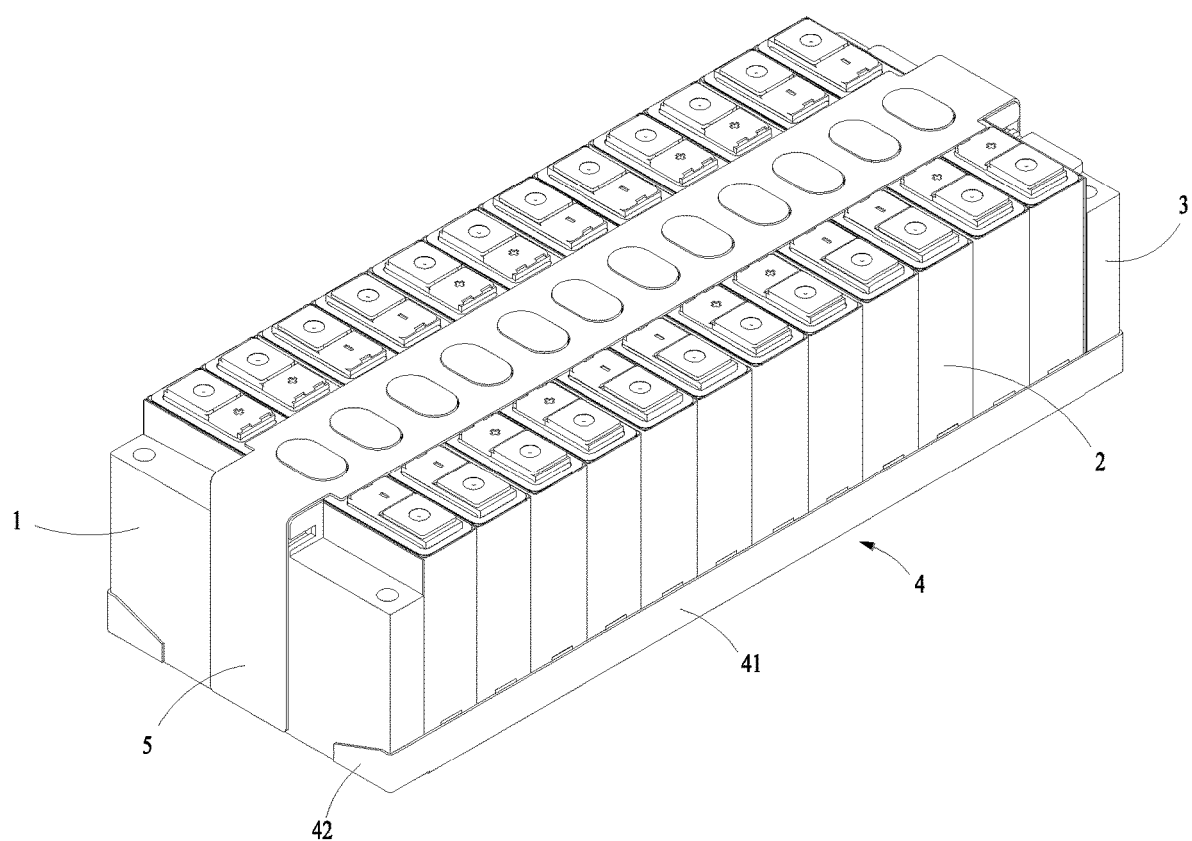
FIG. 1 is a structural schematic diagram of a battery module according to an embodiment of the disclosure.

The views are not necessarily plotted in actual proportion in the drawings.

Reference signs in the drawings:
1 first end plate;
11 first top end;
12 first bottom end;
2 battery;
2a top cover;
20 protrusion;
21 vent;
3 second end plate;
31 second top end;
32 second bottom end;
4 connecting component;
41 main body;
41a first folded segment;
41b second folded segment;
42 free end;
5 pulling component;
51 first connecting segment;
52 intermediate segment;
52a clearance hole;
53 second connecting segment;
X expansion force;
Y tightening force.

DETAILED DESCRIPTION

Below, embodiments of the present disclosure will be further described in detail with reference to the drawings and embodiments. The detailed description according to the embodiments and the accompanying drawings are intended to exemplary illustrate the principles of the present disclosure and are not intended to limit the scope of the present disclosure. That is, the present disclosure is not limited to the described embodiments.

In the description of the present disclosure, it should be noted that, unless otherwise stated, the meaning of "a plurality" is two or more; the orientation or positional relationship indicated by the terms "upper", "lower", "left", "right", "inner", "outer" and the like is merely for the purpose of describing the present disclosure and simplifying the description, and is not intended to indicate or imply that the device or component referred to has a particular orientation, is constructed and operated in a particular orientation, and therefore cannot be understood to be a limitation of the present disclosure. Moreover, the terms "first", "second", and the like are configured for descriptive purposes only and are not to be construed as indicating or implying relative importance.

In the description of the present disclosure, it should be noted that, unless otherwise stated, the terms "installation", "connected to", and "connected with" are to be understood broadly, and may be, for example, a fixed connection, a disassemble connection, or an integral connection; they can be connected directly or indirectly through an intermediate medium. The specific meaning of the above terms in the present disclosure can be understood by the person skilled in the art according to actual circumstance.

For better understanding of the disclosure, a battery module according to embodiments of the disclosure will be described below in detail with reference to FIGS. 1 to 5.

Figure 2:
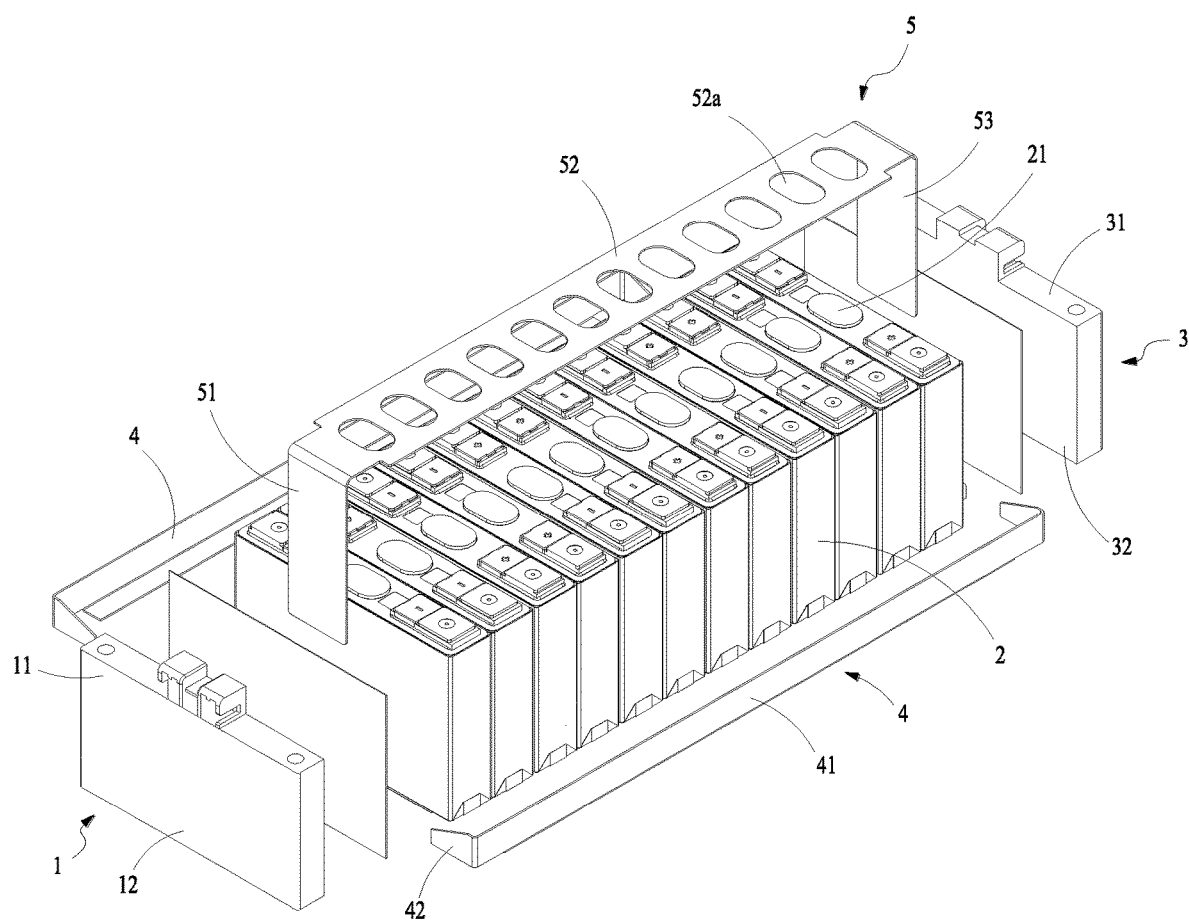
FIG. 2 is an exploded structural view of a battery module according to an embodiment of the disclosure.

As shown in FIG. 1 and FIG. 2, a battery module according to embodiments of the disclosure comprises a first end plate 1, a plurality of batteries 2, a second end plate 3, a connecting component 4 and a pulling component 5. The first end plate 1, the batteries 2 and the second end plate 3 are successively arranged in a direction. The first end plate 1 and the second end plate 3 are fixedly connected through the connecting component 4 and the pulling component 5 to remain at stable relative positions and compress the batteries 2. The battery 2 comprises a housing and a top cover assembly connected to the housing. The top cover assembly comprises a top cover 2a and an electrode terminal disposed at the top cover 2a. The connecting component 4 and the housing of the battery 2 are disposed opposite to each other. A portion of the pulling component 5 between the first end plate 1 and the second end plate 3 is disposed opposite to the top cover 2a. The connecting component 4 and the pulling component 5 are spaced apart. The pulling component 5 can tighten the first end plate 1 and the second end plate 3 in the arrangement direction of the batteries 2 such that the first end plate 1 and the second end plate 3 compress the batteries 2 together.

According to the embodiment, the first end plate 1, the second end plate 3, the connecting component 4 and the pulling component 5 are disposed to surround the batteries 2 arranged in the battery module. The first end plate 1, the second end plate 3, the connecting component 4 and the pulling component 5 form a fixing frame together to compress all the batteries 2 such that all the arranged batteries 2 remain at their stable positions.

Figure 4:
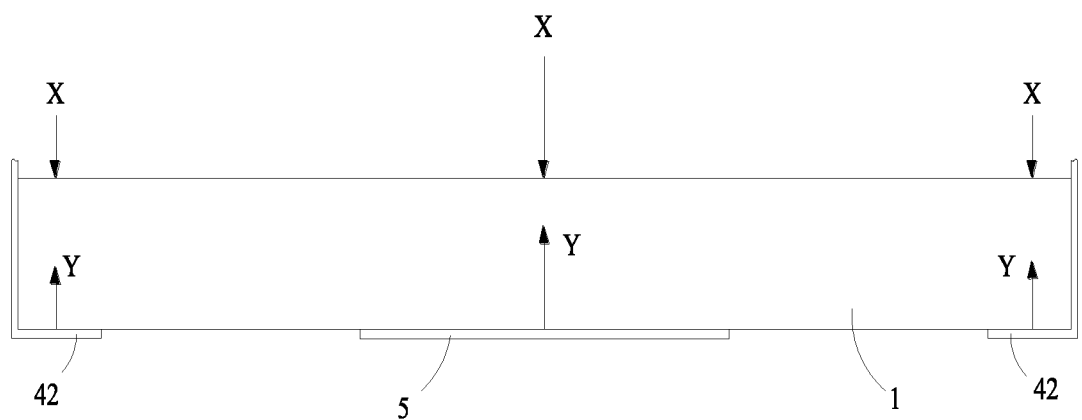
FIG. 4 is a schematic force diagram of a first end plate according to an embodiment of the disclosure.

When at least one battery 2 of the batteries 2 expands and deforms, the expanded battery 2 will exert an expansion force X (as shown in FIG. 4). The expansion force X will be transferred to the fixing frame comprising the first end plate 1, the second end plate 3, the connecting component 4 and the pulling component 5. Since the pulling component 5 and the connecting component 4 simultaneously exert tightening forces Y on the first end plate 1 and the second end plate 3 (as shown in FIG. 6) and the direction of the tightening force Y is opposite to that of the expansion force X, the tightening forces Y can counteract a substantial part of the expansion force X and thus prevent the first end plate 1 and the second end plate 3 from moving or deforming in a direction away from the battery 2. Thereby, it is avoided that the connection between the first end plate 1 and the connecting component 4 and the connection between the second end plate 3 and the connecting component 4 are subject to excessive stresses and thus break. As such, the pulling component 5 can improve the overall structural reliability of the battery module such that the first end plate 1 and the second end plate 3 can bear larger expansion forces X from the batteries 2. It is ensured that the connection between the first end plate 1 and the connecting component 4 and the connection between the second end plate 3 and the connecting component 4 are stable and reliable. Also, it is avoided that the overall dimension of the battery module changes.

According to embodiments of the disclosure, the pulling component 5 comprises a first connecting segment 51, an intermediate segment 52 and a second connecting segment 53 successively arranged. The first connecting segment 51 is fixedly connected to the first end plate 1. The second connecting segment 53 is fixedly connected to the second end plate 3. The intermediate segment 52 of the pulling component 5 extends from the first end plate 1 to the second end plate 3 and is disposed opposite to the top cover 2a of the battery 2. The intermediate segment 52 can be disposed to contact with the top cover 2a or spaced apart from the top cover 2a.

According to the embodiment, the first connecting segment 51 and the first end plate 1 can be fixedly connected through fasteners. The fastener can be bolt, rivet and the like. When the first connecting segment 51 and the first end plate 1 are made of same material, they can be fixedly connected through welding process. According to the embodiment, the second connecting segment 53 and the second end plate 3 can be fixedly connected through fasteners. The fastener can be bolt, rivet and the like. When the second connecting segment 53 and the second end plate 3 are made of same material, they can be fixedly connected through welding process. As such, the pulling component 5 and the first end plate 1 or the second end plate 3 can be connected in multiple flexible ways.

The first end plate 1 according to the embodiment comprises a first top end 11 close to a top portion of the battery 2 and a first bottom end 12 close to a bottom portion of the battery 2. The second end plate 3 comprises a second top end 31 close to a top portion of the battery 2 and a second bottom end 32 close to a bottom portion of the battery 2. According to the embodiment, the connection of the first connecting segment 51 and the first end plate 1 can be positioned at the first top end 11 of the first end plate 1, or at a region from the first top end 11 to the first bottom end 12 of the first end plate 1, or at the first bottom end 12 of the first end plate 1. According to the embodiment, the connection of the second connecting segment 53 and the second end plate 3 can be positioned at the second top end 31 of the second end plate 3, or at a region from the second top end 31 to the second bottom end 32 of the second end plate 3, or at the second bottom end 32 of the second end plate 3.

In an embodiment, the first connecting segment 51 extends from the intermediate segment 52 toward the first bottom end 12 of the first end plate 1 and is fixedly connected to the first bottom end 12 of the first end plate 1. A surface of the first connecting segment 51 away from the battery 2 has a large contact area with the first end plate 1, thus the first connecting segment 51 provides a large force-applying area to the first end plate 1. When the battery 2 expands and deforms, the first end plate 1 will show a trend of moving or deforming in a direction away from the battery 2.

Since the battery 2 may expand at different positions, the first end plate 1 at a region corresponding to the expanded position is subject to a larger force and shows a strong trend of moving or deforming, and at other regions, the first end plate 1 is subject to a smaller force and shows a weak trend of moving or deforming. Since the first connecting segment 51 has a large coverage area for the first end plate 1, it is a high probability case that the region of the first end plate 1 corresponding to the expanded position of the battery 2 is covered by the first connecting segment 51. As such, on one side, the tightening force Y exerted on the first end plate 1 by the first connecting segment 51 can beneficially counteract the expansion force X from the expanded battery 2. On the other side, the region of the first end plate 1 covered by the first connecting segment 51 has a better resistance to deformation than the uncovered regions, and is unlikely to move or deform under the expansion force X. Thereby, it is effectively avoided that the first end plate 1 moves or deforms in the direction away from the battery 2.

Furthermore, the first connecting segment 51 covers a central region of the first end plate 1. On one side, when the battery 2 expands, it will usually have a larger expansion at its central region, thus the central region of the first end plate 1 will be subject to a maximum expansion force X. Since the first connecting segment 51 covers the central region of the first end plate 1, the first connecting segment 51 can directly exert the tightening force Y opposite to the expansion force X on the central region of the first end plate 1 such that it is beneficial to prevent the central region of the first end plate 1 from deforming or prevent the first end plate 1 from entirely moving. On the other side, the first connecting segment 51 can maintain a uniform stress state of the first end plate 1, and it is unlikely a part of the first end plate 1 tilts due to the force. When the first end plate 1 is subject to the expansion force X at a side of the first end plate 1 in a width direction of the battery 2 which is not covered by the first connecting segment 51, since the central region of the first end plate 1 is restrained by the first connecting segment 51, the side of the first end plate 1 will not tilt.

In an embodiment, the second connecting segment 53 extends from the intermediate segment 52 toward the second bottom end 32 of the second end plate 3 and is fixedly connected to the second bottom end 32 of the second end plate 3. A surface of the second connecting segment 53 away from the battery 2 has a large contact area with the second end plate 3, thus the second connecting segment 53 provides a large force-applying area to the second end plate 3. When the battery 2 expands and deforms, the second end plate 3 will show a trend of moving or deforming in a direction away from the battery 2.

Since the battery 2 may expand at different positions, the second end plate 3 at a region corresponding to the expanded position is subject to a larger force and shows a strong trend of moving or deforming, and at other regions, the second end plate 3 is subject to a smaller force and shows a weak trend of moving or deforming. Since the second connecting segment 53 has a large coverage area for the second end plate 3, it is a high probability case that the region of the second end plate 3 corresponding to the expanded position of the battery 2 is covered by the second connecting segment 53. As such, on one side, the tightening force Y exerted on the second end plate 3 by the second connecting segment 53 can beneficially counteract the expansion force X from the expanded battery 2. On the other side, the region of the second end plate 3 covered by the second connecting segment 53 has a better resistance to deformation than the uncovered regions, and is unlikely to move or deform under the expansion force X. Thereby, it is effectively avoided that the second end plate 3 moves or deforms in the direction away from the battery 2.

Furthermore, the second connecting segment 53 covers a central region of the second end plate 3. On one side, when the battery 2 expands, it will usually have a larger expansion at its central region, thus the central region of the second end plate 3 will be subject to a maximum expansion force X. Since the second connecting segment 53 covers the central region of the second end plate 3, the second connecting segment 53 can directly exert the tightening force Y opposite to the expansion force X on the central region of the second end plate 3 such that it is beneficial to prevent the central region of the second end plate 3 from deforming or prevent the second end plate 3 from entirely moving. On the other side, the second connecting segment 53 can maintain a uniform stress state of the second end plate 3, and it is unlikely a part of the second end plate 3 tilts due to the force. When the second end plate 3 is subject to the expansion force X at a side of the second end plate 3 in a width direction of the battery 2 which is not covered by the second connecting segment 53, since the central region of the second end plate 3 is restrained by the second connecting segment 53, the side of the second end plate 3 will not tilt.

Optionally, the first connecting segment 51 is fixedly connected to the first bottom end 12 of the first end plate 1. The second connecting segment 53 is fixedly connected to the second top end 31 of the second end plate 3 or a region between the second top end 31 and the second bottom end 32 of the second end plate 3.

Optionally, the second connecting segment 53 is fixedly connected to the second bottom end 32 of the second end plate 3. The first connecting segment 51 is fixedly connected to the first top end 11 of the first end plate 1 or a region between the first top end 11 and the first bottom end 12 of the first end plate 1.

Optionally, the first connecting segment 51 is fixedly connected to the first bottom end 12 of the first end plate 1. The second connecting segment 53 is fixedly connected to the second bottom end 32 of the second end plate 3.

In an embodiment, the first connecting segment 51 and the second connecting segment 53 are disposed at a same side of the intermediate segment 52. The pulling component 5 as a whole has a U-shaped structure. In an embodiment, the first connecting segment 51 and the second connecting segment 53 have a same structure. The first connecting segment 51 and the second connecting segment 53 extend to the bottoms of the batteries 2 for a same length, respectively. The first connecting segment 51 and the second connecting segment 53 have a same extending dimension in a direction perpendicular to the arrangement direction of the batteries 2. In an embodiment, the battery 2 is a square battery. The above direction perpendicular to the arrangement direction of the batteries 2 is a width direction of the battery 2. As such, the extending dimensions of the first connecting segment 51 and the second connecting segment 53 are their widths.

Since the first connecting segment 51 and the second connecting segment 53 have the same structure, the first connecting segment 51 and the intermediate segment 52 are disposed opposite to each other in the arrangement direction of the batteries 2. Accordingly, a force exerted on the first end plate 1 by the first connecting segment 51 is contrary to a force exerted on the second end plate 3 by the second connecting segment 53, such that there are more uniform stress states in the first end plate 1 and the second end plate 3. As such, when the battery 2 expands, it is possible to maintain the locations of the first end plate 1 and the second end plate 3 unchanged or keep the deformations of the first end plate 1 and the second end plate 3 very small. Thus, it is possible to improve overall structural reliability of the battery module, and keep the overall dimension of the battery module unchanged or ensure the change of the overall dimension very small.

According to the embodiment, a surface of the first connecting segment 51 away from the first end plate 1 is flush with a surface of the first end plate 1 away from the battery 2. A surface of the second connecting segment 53 away from the second end plate 3 is flush with a surface of the second end plate 3 away from the battery 2. As such, the first connecting segment 51 and the second connecting segment 53 of the pulling component 5 will not increase the overall dimension of the battery module, and ensure a compact overall structure of the battery module.

In an embodiment, the pulling component 5 is in a plate shape and has a predetermined thickness and width. Surfaces of the pulling component 5 extending along its width are disposed for contacting with the first end plate 1 and the second end plate 3. The pulling component 5 is made of metal material, such as steel, iron, aluminum alloy and the like.

In an embodiment, the battery 2 comprises a vent 21 disposed at the top cover 2a. The intermediate segment 52 of the pulling component 5 is disposed above the vent 21, and comprises a clearance hole 52a disposed corresponding to the vent 21. As such, in one side, it is avoided the position of the intermediate segment 52 interferes the normal operation of the vent 21. In another aspect, a surface of the pulling component 5 facing the battery 2 can contact with the surface of the top cover 2a. Therefore, the assembling of the pulling component 5 and the battery 2 provides a compact structure and reduces the impact of the pulling component 5 on the overall dimension of the battery module. In another aspect, the intermediate segment 52 can limit each battery 2 to prevent the battery 2 from moving in a vertical direction.

Figure 3:
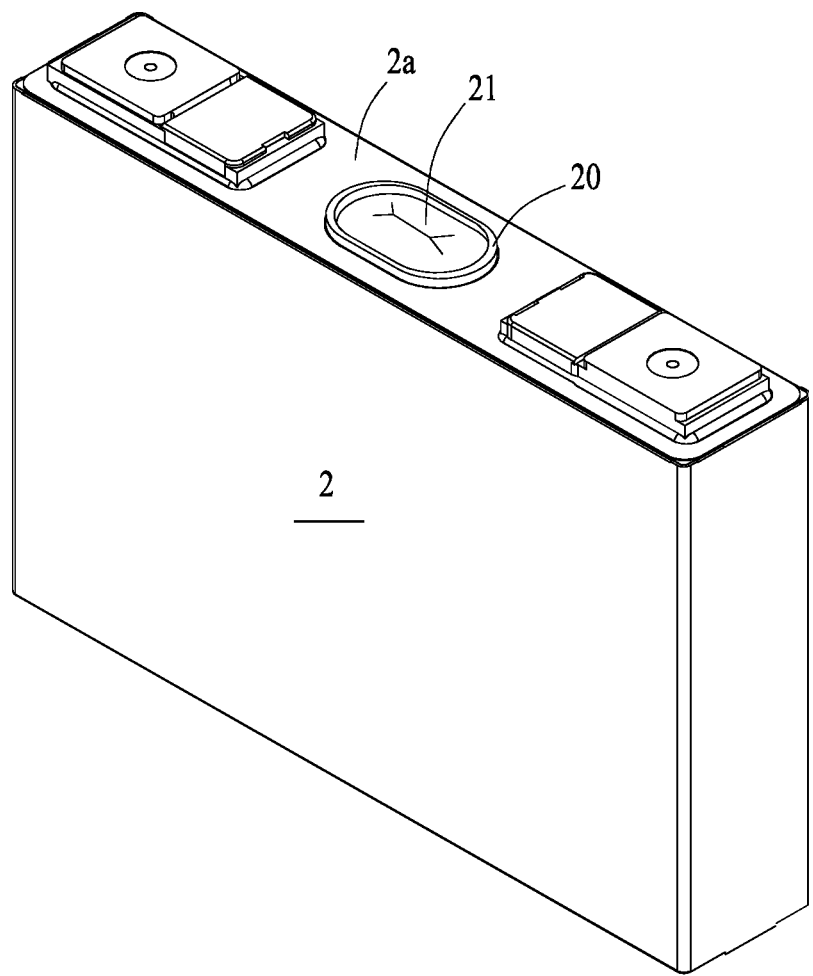
FIG. 3 is a structural schematic diagram of a battery module according to an embodiment of the disclosure.

In another embodiment, as shown in FIG. 3, the battery 2 comprises a vent 21 disposed at the top cover 2a. The top cover 2a comprises an annular protrusion 20. The top cover 2a comprises a through hole in the protrusion 20. The vent 21 is disposed at an inner hole of the annular protrusion 20. The intermediate segment 52 of the pulling component 5 comprises a clearance hole 52a disposed corresponding to the vent 21. The protrusion 20 inserts into the clearance hole to connect with the intermediate segment. The protrusion 20 forms an interference fit with the clearance hole. As such, in one side, it is avoided the position of the intermediate segment 52 interferes the normal operation of the vent 21. In another aspect, since the protrusion 20 of the top cover 2a inserts into the clearance hole 52a, the surface of the pulling component 5 facing the battery 2 can directly contact with the surface of the top cover 2a. Therefore, the assembling of the pulling component 5 and the battery 2 provides a compact structure and reduces the impact of the pulling component 5 on the overall dimension of the battery module. Furthermore, when the protrusion 20 of the top cover 2a inserts into the clearance hole 52a, the intermediate segment 52 can limit each battery 2 through the protrusions 20, and thereby it is avoided that the batteries 2 moves in the arrangement direction. In another aspect, when the pulling component 5 is being mounted, the clearance hole 52a of the intermediate segment 52 surrounds the protrusion 20 such that the pulling component 5 and the top cover 2a can be quickly and correctly positioned and thus the assembling efficiency and accuracy can be improved.

In an embodiment, there is one connecting component 4 which comprises a main body 41 and two free ends 42 disposed at two opposite sides of the main body 41. One free end 41 is fixedly connected to the first bottom end 12 of the first end plate 1, and the other free end 42 is fixedly connected to the second bottom end 32 of the second end plate 3. Optionally, the free end 42 of the connecting component 4 can be fixedly connected to the first end plate 1 or the second end plate 3 through screw, rivet or welding process. A part of the connecting component 4 is disposed below the bottom portion of the battery 2 to support the battery 2. The connecting component 4 and the pulling component 5 are spaced apart in a height direction of the battery 2. The first end plate 1, the second end plate 3, the connecting component 4 and the pulling component 5 form a fixing frame to fix all the batteries 2. Optionally, the connecting component 4 according to the embodiment is in a plate shape. The width of the connecting component 4 is equal to that of the battery 2.

Figure 5:
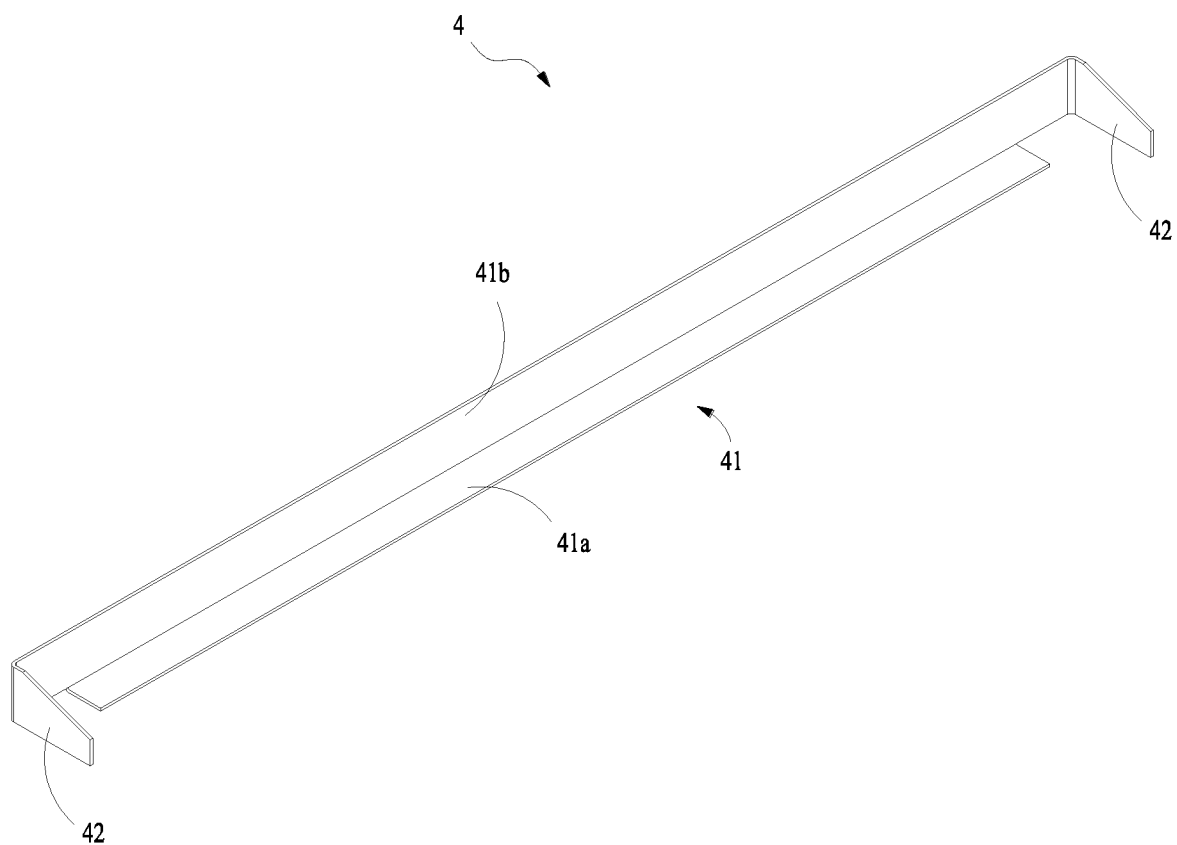
FIG. 5 is a structural schematic diagram of a connecting component according to an embodiment of the disclosure.

In an embodiment, as shown in FIG. 2 and FIG. 5, there are two connecting components 4. Each connecting component 4 comprises a main body 41 and two free ends 42 disposed at two opposite sides of the main body 41. The two connecting components 4 are spaced apart in a direction perpendicular to the arrangement direction of the batteries 2. When the battery 2 is a square battery, the two connecting components 4 are spaced apart in a width direction of the battery 2 to compress the batteries 2 in the width direction of the battery 2.

Optionally, for each connecting component 4, one free end 42 is fixedly connected to the first top end 11 of the first end plate 1 or a region between the first top end 11 and the first bottom end 12, and the other free end 42 is fixedly connected to the second top end 31 of the second end plate 3 or a region between the second top end 31 and the second bottom end 32. In an embodiment, the free end 42 of the connecting component 4 can be fixedly connected to the first end plate 1 or the second end plate 3 through screw, rivet or welding process. In an embodiment, the connecting component 4 is in a plate shape. The connecting component 4 can be made of metal material, such as steel, iron, aluminum alloy and the like.

Optionally, for each connecting component 4, one free end 42 is fixedly connected to the first top end 11 of the first end plate 1, and the other free end 42 is fixedly connected to the second top end 31 of the second end plate 3. In an embodiment, the free end 42 of the connecting component 4 can be fixedly connected to the first end plate 1 or the second end plate 3 through screw, rivet or welding process. As such, both of the two connecting components 4 are spaced apart from the pulling component 5. Therefore, tightening forces Y can be applied to the first end plate 1 or the second end plate 3 at three different locations, such that it is possible to prevent the location or the structure of the first end plate 1 or the second end plate 3 from being changed due to the expansion forces X exerted on the first end plate 1 or the second end plate 3.

Furthermore, the intermediate portion 41 of each connecting component 4 comprises a first folded segment 41a and a second folded segment 41b intersecting with each other. The first folded segment 41a of the connecting component 4 extends to a bottom portion of the battery 2 to support the battery 2. Thus, the first folded segment 41a and the pulling component 5 limit each battery 2 together to prevent the battery 2 from moving in a vertical direction. The second folded segment 41b of the connecting component 4 extends toward a top portion of the battery 2 and contacts with a side portion of the battery 2. Thus, the two connecting components 4 can limit the battery 2 together to prevent the battery 2 from moving in its width direction. Accordingly, it is not necessary to provide binder such as glue between adjacent batteries 2, thus it is possible to reduce assembly difficulty of the batteries 2 and reduce an overall dimension of the assembled batteries 2.

Optionally, an extending dimension of the first folded segment 41a is one eighth to one third of a width of the battery 2. An extending dimension of the second folded segment 41b is one eighth to one third of a height of the battery 2. As such, when the connecting component 4 limits the batteries 2, it is possible to reduce its own weight and thus an overall weight of the battery module. Furthermore, more area of the bottom and side portion of the battery 2 can be exposed, and thus a better heat dissipation effect is obtained.

In an embodiment, the two free ends 42 of the connecting component 4 are bent to a same side such that the connecting component 4 has a U-shaped structure. A free end 42 of the connecting component 4 is connected to a surface the first bottom end 12 of the first end plate 1 away from the battery 2, and the other free end 42 is connected to a surface of the second bottom end 32 of the second end plate 3 away from the battery 2. Accordingly, the two free ends 42 of the connecting component 4 can apply tightening forces Y to the first end plate 1 and the second end plate 3 respectively, from outside of the first end plate 1 and the second end plate 3. As such, it is avoided that the bottoms of the first end plate 1 and the second end plate 3 have a larger movement than their tops and thus tilt due to the expansion forces X.

According to embodiments of the disclosure, the battery module comprises a first end plate 1, a plurality of batteries 2, a second end plate 3, a connecting component 4 and a pulling component 5. The first end plate 1, the batteries 2 and the second end plate 3 are successively arranged in a direction. The first end plate 1 and the second end plate 3 are fixedly connected through the connecting component 4 and the pulling component 5 to form a fixing frame for fixing the batteries 2. The first end plate 1 and the second end plate 3 are pulled by the connecting component 4 and the pulling component 5 to tighten the batteries 2. The structural strength of the battery module is improved. Since the first end plate 1 and the second end plate 3 are restrained by both the connecting component 4 and the pulling component 5, when the battery 2 expands to exert the expansion force X, the first end plate 1 and the second end plate 3 will not move or deform in a direction away from the battery 2 due to the expansion force X. The safety and stability of the battery module in use can be effectively ensured.

Although the present disclosure has been described with reference to the preferred embodiments, various modifications may be made to the present disclosure and components may be replaced with equivalents without departing from the scope of the present disclosure. In particular, the technical features mentioned in the various embodiments can be combined in any manner as long as there is no structural conflict. The present disclosure is not limited to the specific embodiments disclosed herein, but includes all technical solutions falling within the scope of the claims.

What is claimed is:

1. A battery module comprising:
    a first end plate, a plurality of batteries and a second end plate successively arranged in a direction, wherein the battery comprises a top cover;
    a connecting component, wherein the first end plate is fixedly connected to the second end plate through the connecting component; and
    a pulling component comprising a first connecting segment, an intermediate segment and a second connecting segment successively arranged, wherein the first connecting segment is fixedly connected to the first end plate, the intermediate segment is disposed facing the top cover, and the second connecting segment is fixedly connected to the second end plate, and wherein the pulling component can tighten the first end plate and the second end plate in an arrangement direction of the batteries to compress the batteries along with the first end plate and the second end plate,
    wherein the first end plate comprises a first bottom end close to a bottom portion of the battery, and the first connecting segment extends from the intermediate segment toward the first bottom end and is fixedly connected to the first bottom end.

2. The battery module according to claim 1, wherein the first connecting segment and the second connecting segment extend to a same side from the intermediate segment such that the pulling component has a U-shaped structure.

3. The battery module according to claim 1, wherein the first connecting segment covers a central region of the first end plate.

4. The battery module according to claim 1, wherein the second end plate comprises a second bottom end close to a bottom portion of the battery, and the second connecting segment extends from the intermediate segment toward the second bottom end and is fixedly connected to the second bottom end.

5. The battery module according to claim 4, wherein the second connecting segment covers a central region of the second end plate.

6. The battery module according to claim 1, wherein the battery comprises a vent disposed at the top cover, and the intermediate segment comprises a clearance hole disposed corresponding to the vent.

7. The battery module according to claim 6, wherein the top cover comprises an annular protrusion, wherein the vent is disposed in an inner hole of the protrusion, and the protrusion inserts into the clearance hole to connect with the intermediate segment.

8. The battery module according to claim 4, wherein the connecting component comprises a main body and two free ends disposed at two opposite sides of the main body, wherein one of the free ends is fixedly connected to the first bottom end, and the other free end is fixedly connected to the second bottom end.

9. The battery module according to claim 8, wherein there are two connecting components which are spaced apart in a direction perpendicular to the arrangement direction of the batteries to compress the batteries.

10. The battery module according to claim 9, wherein the main body comprises a first folded segment and a second folded segment, wherein the first folded segment extends to the bottom portion of the battery to support the battery, and the second folded segment extends toward a top portion of the battery and contacts with a side portion of the battery.

11. The battery module according to claim 8, wherein the two free ends are bent to a same side such that the connecting component has a U-shaped structure.

12. The battery module according to claim 2, wherein the first connecting segment covers a central region of the first end plate.

13. The battery module according to claim 2, wherein the second end plate comprises a second bottom end close to a bottom portion of the battery, and the second connecting segment extends from the intermediate segment toward the second bottom end and is fixedly connected to the second bottom end.

14. The battery module according to claim 13, wherein the second connecting segment covers a central region of the second end plate.

15. The battery module according to claim 12, wherein the second end plate comprises a second bottom end close to a bottom portion of the battery, and the second connecting segment extends from the intermediate segment toward the second bottom end and is fixedly connected to the second bottom end.

16. The battery module according to claim 15, wherein the second connecting segment covers a central region of the second end plate.

17. The battery module according to claim 9, wherein the two free ends are bent to a same side such that the connecting component has a U-shaped structure.

18. The battery module according to claim 10, wherein the two free ends are bent to a same side such that the connecting component has a U-shaped structure.

* * * * *